D. DILL.
Peanut Oven.

No. 91,098.

Patented June 8, 1869.

Witnesses:

Inventor:
Dexter Dill.
By his Attorney,
John E. Earle

United States Patent Office.

DEXTER DILL, OF NEW HAVEN, CONNECTICUT.

Letters Patent No. 91,098, dated June 8, 1869.

PEANUT-OVEN.

The Schedule referred to in these Letters Patent and making part of the same.

*To all whom it may concern:*

Be it known that I, DEXTER DILL, of New Haven, in the county of New Haven, and State of Connecticut, have invented a new Improvement in Peanut-Oven; and I do hereby declare the following, when taken in connection with the accompanying drawings, and the letters of reference marked thereon, to be a full, clear, and exact description of the same, and which said drawings constitute part of this specification, and represent, in—

Figure 1:
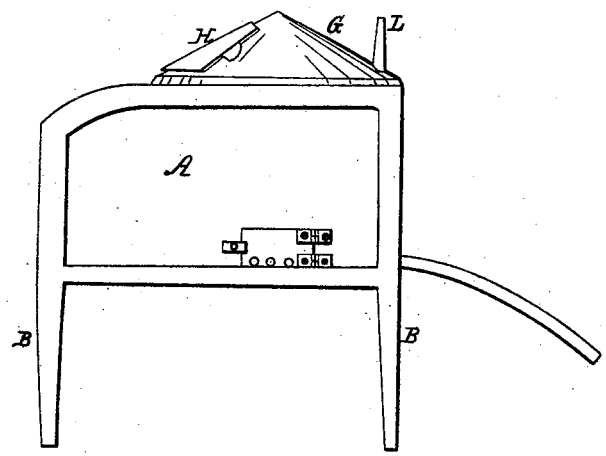
Figure 2:
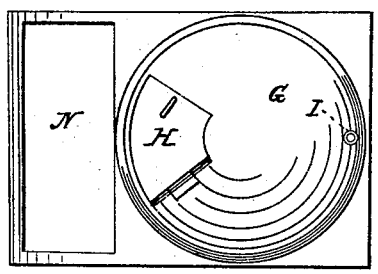

Figure 1, a side view;
Figure 2, a top view; and in
Figure 3, a longitudinal central section.

This invention is designed as an oven, to form a receptacle for peanuts and keep them warm, for sale; and The invention consists in a chamber, constructed with double sides and bottom, and a central hollow tube, communicating with the space formed by the double sides, and combined with a means for communicating heat to the exterior, which will heat water placed within the space, the heated water within the space warming the oven, to keep hot the nuts which are placed therein.

In order to the clear understanding of my invention, I will fully describe the same, as illustrated in the accompanying drawings.

Figure 3:
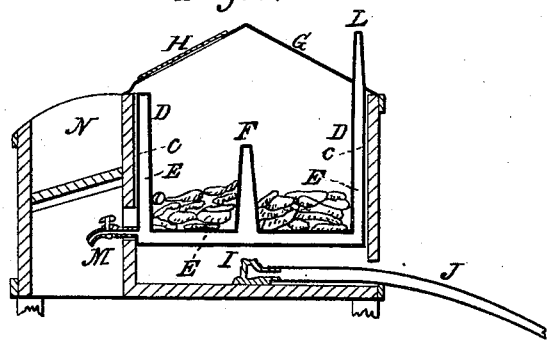

A is a box, or chamber, constructed from wood or suitable material, resting upon legs B B, into which is placed an outer cylinder, C, with an inner cylinder, D, so as to form a space, E, around the inner cylinder, and a tube, F, communicating with the said space, and extending up into the oven, as seen in fig. 3, the whole covered by a top, G, provided with a door, H, which communicates with the oven.

Beneath the outer cylinder is arranged a lamp, or burner, I, supplied through a tube, J, which, when lighted, heats the under surface of the cylinder C.

Water is poured into the space E through the tube L, and by the burner is heated to the extent required, which communicates its heat to the nuts placed within the oven, and keeps them warm, and from the oven the nuts are taken as customers require.

The tube L serves the double service for the escape of steam and the inlet of water.

A discharge-cock, M, is arranged so as to draw off the water when required.

Combined with the whole is a box, N, in which to keep a supply of nuts.

I do not wish to be understood as broadly claiming a double-wall vessel for heating-purposes, for such, I am aware, is not new.

Having fully described my invention,

What I claim as new and useful, and desire to secure by Letters Patent, is—

The herein-described oven, consisting of the two cylinders, C and D, with the space E between them, the central tube F and top G, provided with a door, H, the whole constructed and arranged so as to operate substantially in the manner and for the purpose set forth.

DEXTER DILL.

Witnesses:
A. J. TIBBITS,
J. H. SHUMWAY.